June 11, 1929.                    L. I. HEINTZ                    1,717,029
                    POST CONSTRUCTION FOR VEHICLE BODIES
                    Filed Sept. 16, 1925          2 Sheets-Sheet 2
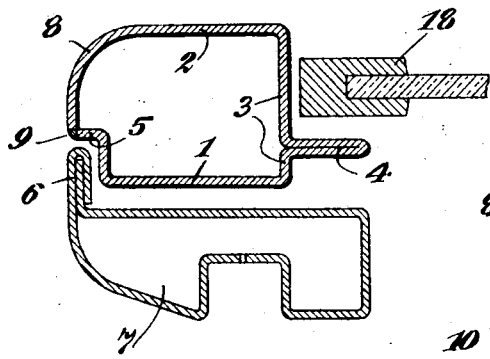
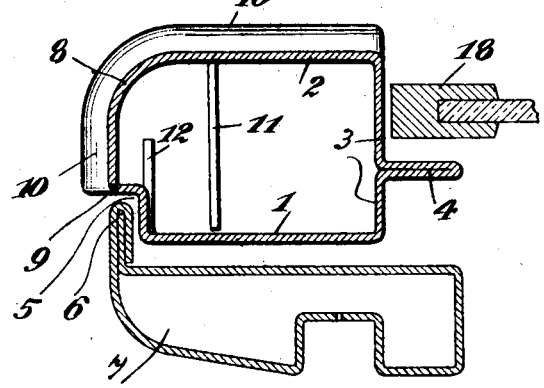
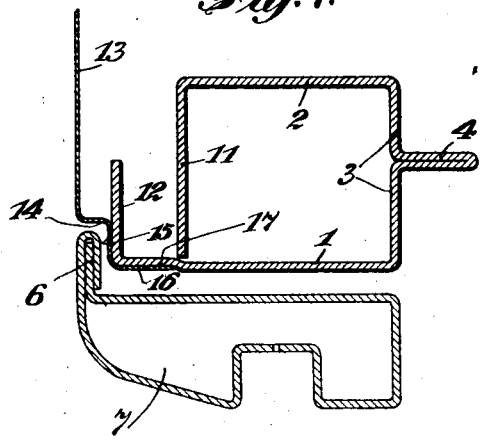
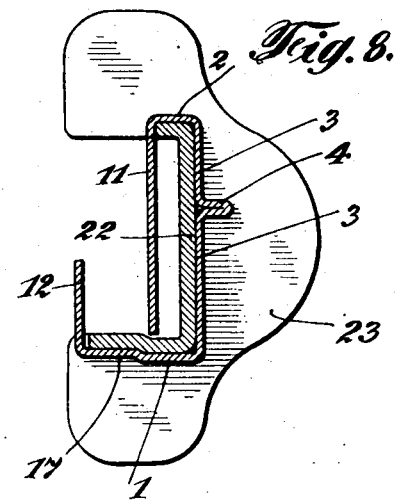
INVENTOR
BY
ATTORNEY Patented June 11, 1929.

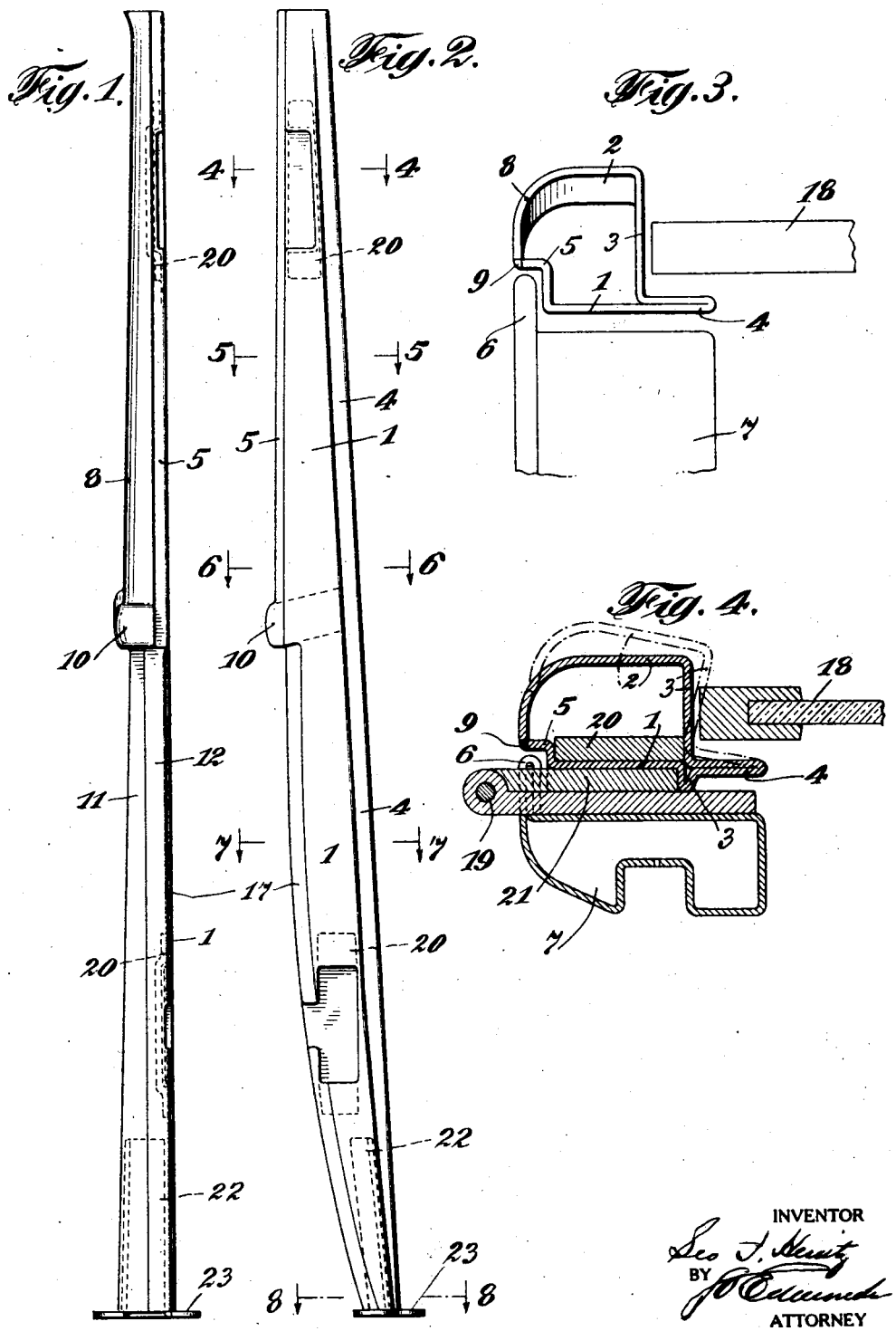
June 11, 1929. L. I. HEINTZ 1,717,029
POST CONSTRUCTION FOR VEHICLE BODIES
Filed Sept. 16, 1925   2 Sheets-Sheet 1

1,717,029

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

POST CONSTRUCTION FOR VEHICLE BODIES.

Application filed September 16, 1925. Serial No. 56,621.

This invention relates to post construction for vehicle bodies, and more particularly relates to all-metal front corner posts for automobile bodies.

The principal object of this invention is to provide a front corner post for vehicle bodies which is very narrow in a direction transverse to the line of vision of the driver of the vehicle and which, in consequence, affords the driver full and clear vision, unobstructed by the post. A further object of this invention is to provide a post which is exceedingly light in weight and one which can be manufactured quickly and inexpensively. Another object of my invention is to provide a post which is sturdy, durable and attractive in appearance. Other objects of this invention will be in part obvious and in part pointed out hereinafter.

In accordance with my invention, the post comprises a single piece of sheet metal and is box-like in cross-section, whereby the post is rendered sturdy and rigid and at the same time presents a finished and attractive appearance, without requiring the application thereto of additional paneling. A post of such construction may be formed easily and cheaply from flat sheet metal plates by simple bending operations, which permit the use of inexpensive and simple apparatus.

In order that a clearer understanding of my invention may be had, attention is hereby directed to the accompanying drawings, forming a part of this application and illustrating one certain embodiment of this invention.

Referring to the drawings, Fig. 1 is a side view of a post embodying my invention; Fig. 2 is a view of the same looking toward another side; Fig. 3 is a top view of the same; and Figs. 4, 5, 6, 7 and 8 are different horizontal sectional views thereof, and are taken respectively on the lines 4—4, 5—5, 6—6, 7—7 and 8—8 of Fig. 2, a fragment of the door being also included in Figs. 4, 5, 6 and 7.

Similar reference characters refer to similar parts throughout the several views of the drawings.

Referring to the drawings, the post consists of a single piece of sheet metal bent into hollow box-like formation and extending the full height of the door. The post includes a rear or jamb wall 1, a front wall 2 and an inside wall 3, along which the sheet metal is doubled upon itself and projects therefrom, as at 4. Along the outer edge of the upper part of wall 1 the edge of the metal sheet is formed into a rabbet 5, positioned to receive the projecting edge 6 of a conventional door 7, and a portion 8 is curved from the wall 2 and ends angularly adjacent the edge of the sheet at the rabbet 5. These abutting edges of the metal sheet are securely seam welded together, as at 9, the welding metal filling the groove presented by the angularly meeting edges of the sheet metal, and thus establishing an exceptionally strong weld. The rabbet 5 ceases at the belt rail and here the wall portions 2 and 8 are shaped to form a belt rail molding 10. From this molding to the bottom of the post a wall 11 extends rearwardly from the outer edge of wall 2. Wall 11 may be disposed inwardly of wall portion 8, if desired. At the outer edge of wall 1 below the molding is a forwardly directed flange 12. A cowl panel 13 is secured to this lower portion of the post. The panel has a rabbet 14, aligning with and forming a continuation of rabbet 5, for the adjacent edge 6 of the door 7. One wall, 15, of the cowl rabbet seats against and is secured to flange 12 and an edge flange 16 of the cowl panel is secured to wall 1, flange 16 preferably seating in a depression 17 in wall 1 so as to be flush with the jamb surface thereof.

Projecting portion 4 may be utilized as a seat for a side edge of a conventional wind shield 18. Wall 1 should conform with the shape of the adjacent door edge wall, and accordingly is made either flat or stepped. The single piece of sheet metal which forms the post provides the panel effect desired at the outer and front surface of the upper part of the post, as well as the molding.

Where the hinges 19 are applied, a reenforcing plate 20 is secured within the post against the rear of wall 1. At such places the wall 1 is preferably depressed inwardly so as to bring the stationary arm 21 of the hinge 19 flush with the adjacent surface of the post. In order to secure these reenforcing plates 20 within the post in a simple and efficient manner, the post is not formed at once into closed box formation, but is left partially open (as indicated by dot and dash lines in Fig. 4), sufficiently to permit the plates 20 to be inserted into proper position, and to permit also of the subsequent insertion of a welding tool, whereby the plates 20 may be welded to walls 1. After these plates have been secured in place, by closing portion 4 of the sheet metal upon itself, the edges of the piece of sheet metal are brought together and are then seam welded at the joint.

A suitable member for connecting the bottom of the post to a vehicle frame may comprise a metallic member having an angular vertical portion 22 fitting within the post and secured thereto, and having a base portion 23 adapted to rest against and be secured to a convenient vehicle frame member (not shown).

From the foregoing it will be readily apparent that the post is of exceedingly simple and inexpensive construction, comprising only a single sheet of light gauge metal, exclusive of the hinge reenforcements. The attachment of the post to the body frame is simple. It will also be apparent that the configuration and formation of the post permits a construction which is small and compact in cross-section, so as to afford the driver of the vehicle full and clear vision, while the post, at the same time, is exceedingly sturdy. A post of this construction may be made very attractive in appearance and does not require the application of separate paneling for this purpose.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. The method of constructing a post of the character described, which includes shaping a piece of sheet metal to establish the various walls of the post and leaving the edges of the sheet spaced apart sufficiently to permit the insertion of a welding tool within the post, inserting a reenforcing plate within the post and welding the plate to one of the walls thereof, and finally bringing and welding the said edges of the sheet together, whereby the post is given a closed box-like cross-section with the reenforcing plate rigidly secured in the interior thereof.

2. The method of constructing a post of the character described, which includes shaping a piece of sheet metal to establish the various walls of the post and an outwardly extending doubled portion on the wall opposite the edges of the sheet, the doubled portion being not completely closed on itself and the edges of the sheet being separated sufficiently to permit of the insertion of a welding tool within the post, inserting a reenforcing plate into the post and welding the plate thereto, collapsing said doubled-over portion upon itself to bring the edges of the sheet together, and finally welding said edges together.

3. An automobile body, in combination, a body post extending from the floor to the ceiling thereof, said post consisting of a single piece of sheet metal having a tubular cross-sectional configuration, the edges of the sheet above the belt line of the body abutting each other, the front and rear sides of said body post below the belt line having flanged ends, one extending over the other, said post having a doubled over reinforcing portion projecting from the inside wall and extending substantially the full length thereof.

4. In closed body construction of the character described, in combination, a body post, said body post extending the full height of said body and consisting of a single piece of sheet metal having a tubular cross-sectional configuration, the edges of the sheet above the belt line abutting and welded to each other, the edges of the sheet below the belt line extending over and spaced from each other, said post having a doubled over reinforcing portion projecting from the inside wall and extending substantially the full length thereof.

5. A body post for closed body construction consisting of a single piece of sheet metal tubular in cross-section, the edges of the sheet above the belt line abutting each other, the front and rear sides of said post below the belt line being of unequal length and having flanged ends, one extending over the other and the inside wall of said post above and below the belt line being provided with a continuous doubled over reinforcing portion projecting therefrom.

6. A body post for closed body construction consisting of a single piece of sheet metal bent into tubular configuration, said sheet metal having a longitudinally extending doubled over portion projecting from the door edge wall of said post and forming a seating abutment for a hinge member, and a reenforcing bar secured to the inside face of said door edge wall.

7. In closed body construction of the character described, in combination, a body post consisting of a single piece of sheet metal having a tubular cross-sectional configuration, the front and rear sides of said body post at its lower extremity being of unequal length and having flanged ends, one extending over the other, and a foot member having a base portion and a channel portion projecting within the post, said channel portion having a leg thereof extending beyond the flanged front wall of said post.

8. A post of the character described, consisting of a single piece of light sheet metal having a tubular cross sectional configuration, the edges of the sheet abutting each other at the upper portion of the post and spaced apart and extending over each other at the lower portion of the post, and a doubled over reinforcing portion projecting from the inside wall of the post and extending substantially the full length thereof.

This specification signed this 12th day of September, 1925.

LEO I. HEINTZ.